United States Patent [19]

Williams, Jr. et al.

[11] 3,916,173

[45] Oct. 28, 1975

[54] PLURAL SCALE SYSTEM WITH DIGITAL ZERO CORRECTION

[75] Inventors: Roger B. Williams, Jr., Sylvania, Ohio; Richard C. Loshbough, Temperance, Mich.

[73] Assignee: Reliance Electric Company, Pepper Pike, Ohio

[22] Filed: June 27, 1974

[21] Appl. No.: 483,637

[52] U.S. Cl. ........ 235/151.33; 177/165; 177/DIG. 3
[51] Int. Cl.² ................. G01G 9/413; G01G 13/14
[58] Field of Search... 235/151.33, 92 WT, 153 AC; 177/165, 199, 210, DIG. 3; 340/146.1 A

[56] References Cited
UNITED STATES PATENTS

| | | | |
|---|---|---|---|
| 3,709,309 | 1/1973 | Williams et al. | 177/165 |
| 3,716,706 | 2/1973 | Gray | 235/151.33 |
| 3,754,126 | 8/1973 | Williams, Jr. | 235/151.33 |
| 3,770,069 | 11/1973 | Loshbough | 235/151.33 |
| 3,777,828 | 12/1973 | Dietemeyer | 177/165 |
| 3,789,202 | 1/1974 | Yamanaka | 235/151.33 |
| 3,797,595 | 3/1974 | Yin et al. | 177/DIG. 3 |

*Primary Examiner*—Malcolm A. Morrison
*Assistant Examiner*—Errol A. Krass

[57] ABSTRACT

In a plural scale system such as a parts counter, apparatus for digitally compensating for zero errors in the weight outputs of the scales. Analog weight outputs from the scales are selectively connected through an analog-to-digital converter to a digital computer. The computer corrects the digitized weight from each connected scale by a zero error correction factor for such connected scale and stores the corrected weight in a memory. Whenever the corrected weight for a connected scale deviates from zero by less than a predetermined small amount, a new zero error correction factor is established for that scale. In a parts counter, the corrected weights of a known number of sample parts and of the unknown number of parts being counted are used by the computer for calculating a parts count.

8 Claims, 3 Drawing Figures

FIG-2-

PLURAL SCALE SYSTEM WITH DIGITAL ZERO CORRECTION

BACKGROUND OF THE INVENTION

This invention relates to plural scale weight measuring systems and more particularly to improved apparatus for digitally correcting for zero errors in measured weights from a plurality of scales. The apparatus is particularly suitable for plural scale systems which include a computer, such as systems which compute a count of an unknown number of parts from the net weight of the parts and an average part weight.

Various types of systems involve the use of a plurality of scales for supplying weight data. One such system is a parts counter which determines a count of the number of parts in a container based upon the total net weight of the parts in the container and an average weight for such parts. A system of this type is typically provided with a minor or sample part scale which measures the weight of a predetermined number of the parts and with a major scale which measures the gross weight of the parts to be counted. Computing apparatus then computes an average part weight from the weight of the sample parts and the known number of sample parts placed on the minor scale. The computing apparatus also subtracts a tare weight from the measured gross weight of the parts being counted to obtain a net weight for such parts. Subsequently, the average part weight is divided into the net weight of the parts being counted to obtain a count of the number of parts on the major scale. Parts counters of this type are generally provided with either a single display for selectively indicating the computed count, the weight of the parts being counted and the weight of the sample parts, or with individual displays for this data. Other types of plural scale systems are also well known. A batch weighing system for example may include a plurality of weight measuring scales connected to a single batch process control computer.

One problem commonly encountered with plural scale systems is in correcting the weight output of each of the scales for zero error under a no load condition. Zero error may occur from various sources. If the scale is of a load cell type, error may occur in the output of the load cell due to long term ageing effects and also due to changes in the operating temperature and voltage of the load cell. Furthermore, if the analog output of the load cell or other type of scale is amplified, zero error may occur in the form of an unwanted DC component in the analog output from the amplifier. Various circuitry has been used in the past for correcting for zero errors in weight measuring apparatus. U.S. Pat. No. 3,709,309 which issued on Jan. 9, 1973 to Roger B. Williams, Jr. et al discloses circuitry for automatically compensating for an unwanted DC component in the output of an analog weight signal amplifier. However, circuitry of this type does not take into account long term changes in the output of the weight measuring load cell. Still another arrangement is shown in U.S. Pat. No. 3,716,706 which issued on Feb. 13, 1973 to Alden J. Gray. In the parts counting system disclosed in the Gray patent, an amplifier sums the analog output from a load cell with a manually adjusted DC voltage. The DC voltage is adjusted to eliminate a DC component in the amplified analog weight signal. However, no provision is made for automatically updating the DC voltage summed with the weight signal as zero errors change over a period of time.

SUMMARY OF THE INVENTION

According to the present invention, improved apparatus is provided for digitally compensating for zero errors in the weight outputs from a plurality of scales in a plural scale system. The apparatus is particularly useful in a parts counting system in which a count of an unknown number of parts in a container is computed from the net weight of the parts in the container and the weight of a known number of sample parts. Such systems are provided with a major scale for measuring the weight of the parts being counted and a minor scale for measuring the weight of the sample parts. The weights are then supplied to a computer which calculates the parts count.

Analog weight outputs from each of the scales in the plural scale system are selectively connected through an analog-to-digital converter to a digital computer which compensates for zero errors. The computer corrects each digitized weight for a connected scale by a zero error correction factor for the connected scale and stores the corrected weight in a memory. Whenever the corrected weight for a scale deviates from zero by less than a predetermined small amount, the current weight output from the scale is stored in a memory for use as an updated zero error correction factor. Thus, when the updated zero error correction factor is combined with the digitized output for the empty scale, such output goes to zero. By using the above-described apparatus for compensating for zero errors, the output of each scale will be maintained accurate even though a slow long term drift or ageing effect occurs in the output from the scale load cell and the connected circuitry.

Accordingly, it is a preferred object of the invention to provide improved apparatus for automatically zeroing the output of a plurality of scales in a plural scale system.

Another object of the invention is to provide improved apparatus for maintaining a high degree of accuracy in a parts counter which includes a major scale for measuring the weight of parts being counted and a minor scale for measuring the weight of a known number of sample parts.

Other objects and advantages of the invention will become apparent from the following detailed description, with reference being made to the accompanying drawings.

DESCRIPTION OF THE PREFERRED EMBODIMENTS

Figure 1:
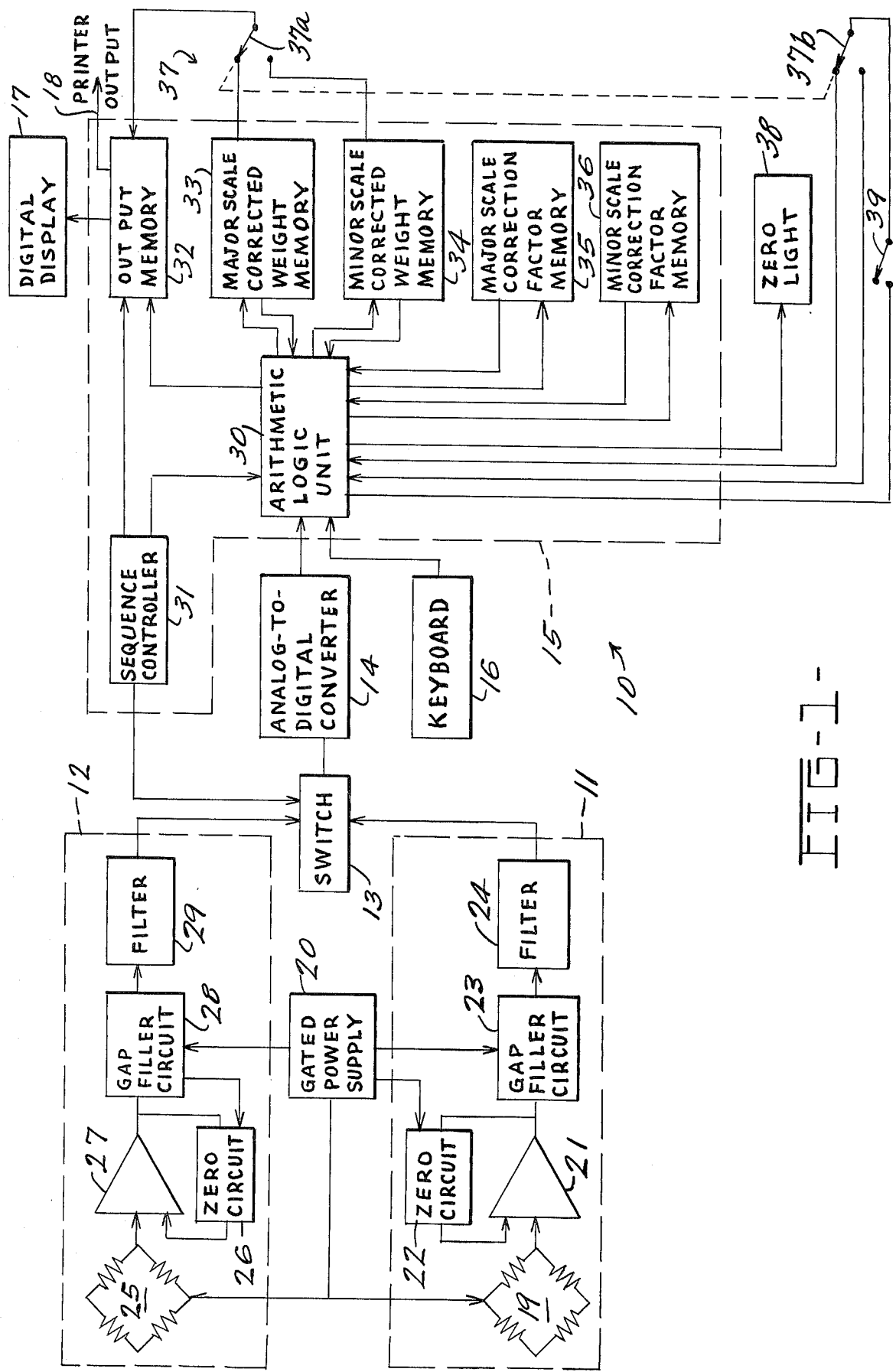
FIG. 1 is a schematic block diagram of parts counting apparatus embodying the present invention.

Turning now to the drawings and particularly to FIG. 1, a block diagram is shown for a parts counter 10 which incorporates the present invention. The parts counter 10 generally comprises a major load cell scale 11 for measuring the gross weight of an unknown number of parts to be counted and a minor load cell scale 12 for measuring the net weight of a known number of sample parts. The scales 11 and 12 are selectively connected through a switch 13 to apply weight data through an analog-to-digital converter 14 to a digital computer 15. The digital computer 15 also receives input data from a keyboard 16 and supplies output data to a digital display 17 and to an output terminal 18 for connection to an optional printer (not shown).

The scales 11 and 12 may be of any suitable type. One type of load cell scale which is particularly well suited for use in the parts counter 10 is disclosed in United States Patent 3,709,309 which issued to Roger B. Williams, Jr. et al on January 9, 1973. The analog portion of the scale disclosed in such patent may be adapted to serve as both the major scale 11 and the minor scale 12, while the dual slope analog-to-digital converter disclosed in such patent may be used as the analog-to-digital converter 14. Instead of an analog scale being continuously connected to an analog-to-digital converter, as in the Williams, Jr. et al patent, the switch 13 selectively connects the two analog scales 11 and 12 to the single analog-to-digtal converter 14. The switch 13 may be of any conventional type, such as a solid state switch, and is controlled by the digital computer 15. The computer 15 activates the switch 13 to selectively connect the scales 11 and 12 to the converter 14 at the proper times during each parts counting cycle.

The major scale 11 includes a load cell 19 which is positioned beneath a weighing platter or platform on which a container holding the unknown number of parts to be counted is placed. The load cell 19 is energized from a gated power supply 20. While the load cell 19 is energized, an analog weight signal is applied to an amplifier 21 which amplifies and establishes the span or range of the analog weight signal for a given range of weights placed on the load cell 19. The output of the amplifier 21 will normally tend to have an unwanted DC component which offsets the analog weight signal from a zero setting. Although the unwanted DC component can be compensated for by summing a fixed DC signal with the output of the load cell 19, problems occur due to variations in the unwanted DC component caused, for example, by temperature and voltage variations. Therefore, circuitry is provided for automatically zeroing or removing the unwanted DC component from the output of the amplifier 21. This circuitry includes the gated power supply 20, an auto-zero circuit 22 and a gap filler circuit 23. The auto-zero circuit 22 generates a DC error correction signal which is summed in the amplifier 21 with the analog weight signal from the load cell 19. The DC error correction signal from the auto-zero circuit 22 causes the amplifier 21 to have a zero level output when the input from the load cell 19 is zero, thereby eliminating the unwanted DC component from the output of the amplifier 21. However, the DC error correction signal is periodically updated to compensate for changes in the DC component being removed from the output of the amplifier 21. During normal operation of the load cell 19 for generating an analog weight signal, the weight signal is amplified by the amplifier 21 and passes through the gap filler circuit 23 and a low pass filter 24 to the switch 13. The gated power supply 20 periodically supplies power signals first to the gap filler circuit 23 and then to the auto-zero circuit 22. When the gated power supply 20 applies power to the gap filler circuit 23, the gap filler circuit maintains the current output from the amplifier 21 as a constant weight signal to the low pass filter 24. While the constant weight signal is applied to the low pass filter 24, the gated power supply 20 removes power from the load cell 19 and, subsequently, causes the auto-zero circuit 22 to generate an updated DC error correction signal having the voltage level necessary for zeroing the output of the amplifier 21. After the output of the amplifier 21 is zeroed, power is restored to the load cell 19 and the gap filler circuit 23 is disabled. The DC error correction signal is maintained constant until the next auto-zero cycle of the gated power supply 20. Details of the auto-zero circuitry are described in the Roger B. Williams, Jr. et al U.S. Pat. No. 3,709,309.

The minor scale 12 which measures the weight of a known number of sample parts is identical to the major scale 11. The minor scale 12 includes a load cell 25 which is positioned below a platter or container for holding the sample parts. The gated power supply 20 excites the load cell 25 along with the load cell 19. The output of the load cell 25 is summed with a DC zero error correction signal from an auto-zero circuit 26 by an amplifier 27 which also controls the span or range of the analog weight signal. The output of the amplifier 27 is connected through a gap filler circuit 28 and a low pass filter 29 to the switch 13. The gated power supply 20 controls power to the auto-zero circuit 26 and the gap filler circuit 28 so that both the major scale 11 and the minor scale 12 are zeroed at the same time.

As previously indicated, the digital computer 15 causes the switch 13 to selectively connect the major and minor scales 11 and 12 to an analog-to-digital converter 14 at the appropriate time in each parts counting cycle. The analog-to-digital converter 14 may be of the dual slope integrating type disclosed in U.S. Pat. No. 3,709,309 or it may be of any other conventional design. The digital computer 15 may, in the broadest aspect of the invention, consist of any general purpose digital computer capable of performing arithmetic operations in a predetermined programmed sequence. However, in a preferred embodiment of the invention, the computer 15 consists of an integrated circuit microcomputer such as the Model MCS-4 microcomputer set manufactured by Intel Corporation of Santa Clara, California. The MCS-4 microcomputer set consists of an integrated circuit arithmetic logic unit combined with one or more integrated circuit random access memories and one or more integrated circuit read only memories containing a fixed program. The program stored in the read only memories controls the operating sequence of the parts counter 10 and will be readily apparent to those skilled in the microcomputer programming art. The program stored within the read only memories controls the sequence in which the digital computer 15 recognizes input data from the major and minor scales 11 and 12 and the keyboard 16, the parts count computation sequence and the sequence in which output data is supplied to the digital display 17 and the printer output 18.

To facilitate understanding the manner in which the computer 15 operates, the computer 15 is shown pictorially in FIG. 1 as including an arithmetic logic unit 30, a sequence controller 31 and a plurality of memories including an output memory 32, a major scale corrected weight memory 33, a minor scale corrected weight memory 34, a major scale correction factor memory 35 and a minor scale correction factor memory 36. The sequence controller 31 generally comprises one or more preprogrammed read only memories which control the operation of the switch 13 which is external to the computer 15, the operating sequence of the arithmetic logic unit 30 and the storage of data in the output memory 32. At the beginning of a parts count cycle, the sequence controller 31 causes the switch 13 to connect the major scale 11 to the analog-to-digital converter 14. The arithmetic logic unit 30 takes the digitized weight signal from the major scale 11 and subtracts a major scale zero correction factor stored in the memory 35 from this value. The result is then stored in the major scale corrected weight memory 33. The sequence controller 31 also causes the switch 13 to connect the minor scale 12 to the analog-to-digital converter 14. The minor scale zero correction factor stored in the memory 36 is subtracted from the digitized minor scale weight signal and the result is stored in the minor scale corrected weight memory 34. If a tare weight has been supplied to the digital computer 15, such tare weight, which is stored within another internal memory, is subtracted from the major scale corrected weight stored in the memory 33 and the resulting net weight is then stored in the memory 33. The contents of the major scale corrected weight memory 33 and the contents of the minor scale corrected weight memory 34 are selectively connected through contacts 37a of a switch 37 to the output memory 32. Depending upon the setting of the switch 37, the significant weight digits of either the zero corrected net weight on the major scale 11 or the zero corrected net weight on the minor scale 12 will be stored in the output memory 32 for displaying on the digital display 17. For the following description, it will be assumed that the significant weight digits from the major scale corrected weight memory 33 range from 00.01 pound to 80.00 pounds in 0.01 pound increments and from the minor scale corrected weight memory 34 range from 0.0002 pound to 2.0000 pounds in 0.0002 pound increments. However, finer weight graduations are stored in the memories 33 and 34 to facilitate accurate zero correction to the least significant weight digit. After the arithmetic logic unit 30 computes a count of the number of parts on the major scale 11 from the contents of the memories 33 and 34 and a count of the number of sample parts on the minor scale 12 entered through the keyboard 16, the resulting count is stored in the output memory 32 for displaying on the digital display 17 in place of a weight.

While the digital display 17 indicates the weight on one of the scales 11 or 12, an operator would not normally know whether or not the other scale is on zero. Therefore, the memory 34 is connected to the arithmetic logic unit 30 which compares the weight stored in the memory 34 with zero. When the weight reading is zero, the arithmetic logic unit 30 causes a zero light 38 to be illuminated. Thus, when both the major scale 11 and the minor scale 12 are empty, the digital display 17 normally indicates whether the major scale 11 is correctly zeroed while the zero light 38 indicates whether the minor scale 12 is correctly zeroed. As will be discussed in greater detail below, the zero correction factor for each of the scales 11 and 12 stored in the memories 35 and 36, respectively, are revised when the contents of the related memories 33 and 34 are less than a predetermined small amount. For example, when the contents of the minor scale corrected weight memory 34 deviate from zero by less than ±0.0002 pound, it may be assumed that such deviation is caused by zero error. Therefore, the contents of the minor scale zero correction factor memory 36 is updated by storing in such memory 36 the digitized weight output from the minor scale 12. Since the output of the minor scale 12 is then equal to the zero error correction factor stored in the memory 36, the contents of the memory 34 will then go to zero. A similar correction is made to the major scale zero error correction factor stored in the memory 35 when the contents of the memory 33 are less than a predetermined small amount such as 0.01 pound.

In some instances, it may be desirable to correct for weight errors greater than the predetermined small amount. Therefore, a switch 39 is provided for causing the arithmetic logic unit 30 to expand the range of deviation for which a zero error correction factor is updated for the scale connected to the output memory 32. The switch 37 includes a set of contacts 37b connected in series with the switch 39 for determining which of the scales 11 and 12 will be zeroed for an expanded range. The switch contacts 37b permit expansion of the predetermined small range of deviation for which a zero correction factor is updated only for the scale connected through the output memory 32 to the digital display 17 so that an operator of the parts counter 10 will have a visual indication of the weight deviation before the range is expanded. This prevents the operator from accidentally expanding the zero correction range for the scale not connected to the display which could result in the output for such scale being zeroed while parts are present on the scale.

Figure 2:
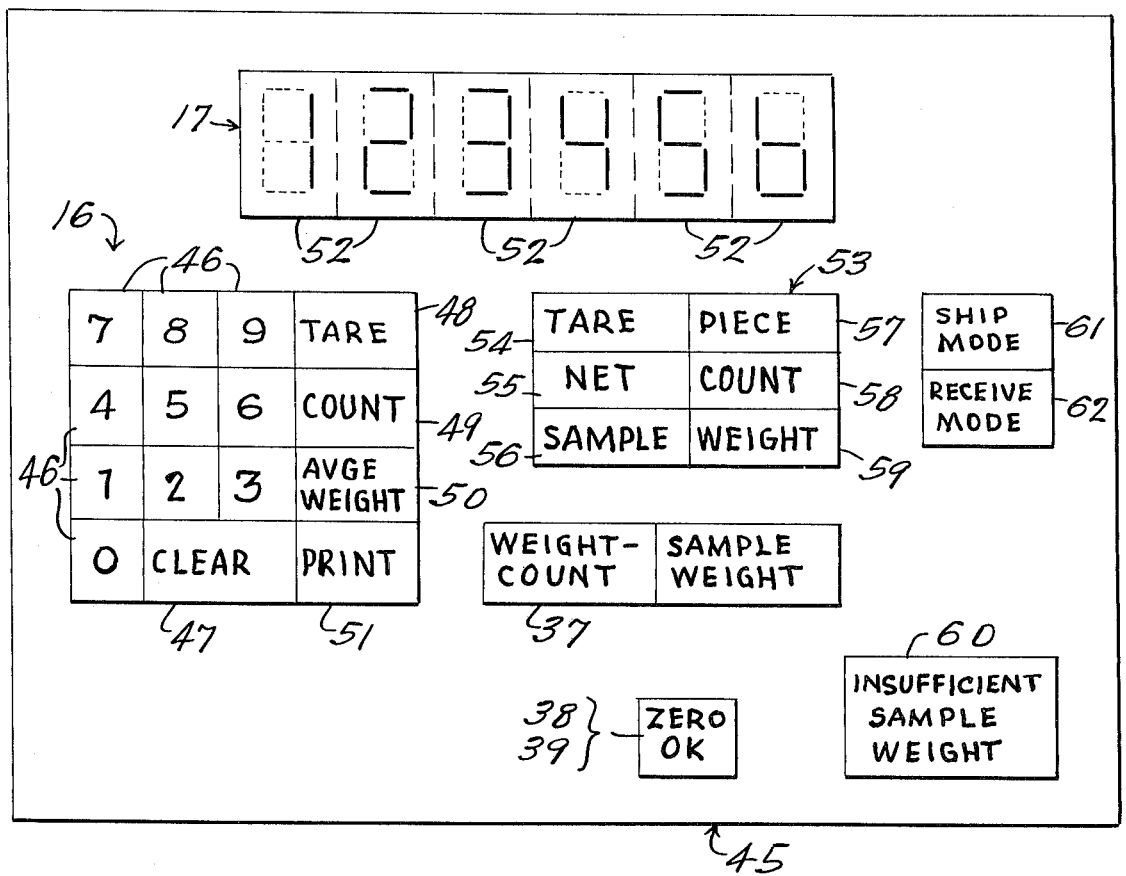
FIG. 2 is a front elevational view of a control panel for the parts counting apparatus of FIG. 1.

Turning now to FIG. 2, a front view is shown of a control panel 45 which mounts the keyboard 16, the digital display 17, the switches 37 and 39 and the zero light 38. The keyboard 16 includes ten keys 46 for entering the digits zero through nine, a "clear" key 47, a "tare" key 48, a "count" key, an "average weight" key 50 and a "print" key 51. The digit keys 46 may key 49, used for entering into the digital computer 15 a tare weight for the major scale 11 and either a count of the known number of sample parts on the minor scale 12 or, when the minor scale 12 is not used, an average weight for the parts being counted. The digital display 17 includes a plurality of digit indicators 52, six of which are shown. The digit indicators 52 may be of any conventional type such as seven-segment indicators having segments selectively illuminated by means of incandescent lamps, gas discharge tubes or light emitting diodes. In addition, there is an indicator panel 53 having a plurality of selectively illuminated legends for identifying the data currently being shown on the digit indicators 52. The indicator panel 53 includes a "tare" legend 54, a "net" legend 55, a "sample" legend 56, a "piece" legend 57, a "count" legend 58 and a "weight" legend 59. Either one or two of the legends 54–59 will be illuminated at any given time to identify the numerical data shown on the digit indicators 52. The control panel 45 also includes an indicator 60 which is illuminated when the weight on the minor scale 12 is insufficient for obtaining an accurate average weight of the parts being counted. The indicator 60 is illuminated to annunciate this fact whenever the output of the minor scale 12 is less than a predetermined small value such as one percent of the capacity of such scale or 0.0200 pound. Finally, the control panel 45 includes a pair of interlocked mode switches 61 and 62. The switch 61 is closed when the parts counter 10 is operated in a "ship" mode and the switch 62 is closed whenever the parts counter 10 is operated in a "receive" mode, as will be discussed in greater detail below.

The operating sequence of the parts counter 10 is more readily understood by referring to both FIGS. 1 and 2. Initially, an operator may place a container holding the unknown number of parts to be counted on the major scale 11 and he may also place a known number of sample parts on the minor scale 12 for obtaining an average part weight. For normal operation, the switch 37 will be set to the "weight/count" position. As soon as a container is placed upon the major scale 11, the zero corrected gross weight on such scale 11 appears on the digit indicators 52 and the "weight" legend 59 becomes illuminated. The corrected gross weight from the major scale 11 is stored in the major scale corrected weight memory 33 and, as long as such weight is displayed on the digit indicators 52, also in the output memory 32. The operator may then enter the tare weight of the container holding the parts to be counted. The tare weight is entered by sequentially pushing the appropriate digit keys 46 on the keyboard 16. As soon as the first digit key 46 is pushed, the digit is shifted into the output memory 32 for display on the digit indicators 52 and the "tare" and the "weight" legends 54 and 59 on the indicator panel 53 are illuminated. After the complete tare weight of any container on the major scale 11 has been entered and is verified on the digital display 17, the operator pushes the "tare" key 48. When the tare key 48 is pushed, the arithmetic logic unit 30 in the digital computer 15 subtracts the entered tare weight from the measured gross weight on the scale 11 and stores the resulting net weight in the memory 33. Contents of the memory 33 are also stored in the output memory 32 for display on the digit indicators 52 and the "net" and "weight" legends 55 and 59 are illuminated to identify the displayed data.

After the tare weight is entered through the digit keys 46 and a net weight is computed, the operator again pushes the digit keys 46 to enter a count of the known number of sample parts on the minor scale 12. As soon as the first digit key 46 is pushed, the entered digit appears on the digit indicators 52 and the "sample" and the "count" legends 56 and 58 are illuminated to identify the displayed data. After a count of the known number of sample parts is entered through the digit keys 46, the operator pushes the "count" key 49, thereby causing the digital computer 15 to compute a count of the number of parts on the major scale 11 from the total sample part weight, the count of the number of sample parts and the net weight of the parts being counted. As soon as the digital computer 15 computes a count of the number of parts on the major scale 11, the count is stored in the output memory 32 for display on the digit indicators 52 and the "count" legend 58 is illuminated. The operator may then push the "print" key 51 to cause a record to be printed if the optional printer is connected to the auxiliary output terminal 18 from the output memory 32.

In some instances the minor scale 12 is not used for obtaining an average part weight from a known number of sample parts. This is particularly true where the parts are extremely light and a large number of sample parts would be required for obtaining a valid average part weight. In this case, the average part weight is entered directly through the keyboard 16. After the parts to be counted are placed upon the major scale 11 and a tare weight for any container holding such parts is entered, the operator then presses the digit keys 46 to enter an average part weight in the same manner in which he would otherwise enter a count of the known number of parts on the sample scale 12. However, the digital computer 15 is programmed to recognize when the output of the minor scale 12 is below a predetermined minimum amount, such as 0.1% of the capacity of the minor scale 12 or 0.0020 pound. When the minor scale output is below such predetermined minimum weight, the digital computer 15 recognizes the digits entered through the digit keys 46 of the keyboard 16 as an average part weight instead of a sample part count. As soon as the first digit key 46 is pushed, the "sample" legend 56 and the "weight" legend 59 of the indicator panel 53 are illuminated and the entered digit appears on the digit indicators 52. After an average part weight is entered, the operator pushes the average weight key 50 and the digital computer 15 computes a count of the number of parts on the major scale 11. The computed count then appears on the digit indicators 52 and the "piece" legend 57 and the "count" legend 58 are illuminated.

In some instances, an operator may wish to know the weight on the minor scale 12. In this case, the operator pushes a "sample weight" side of the switch 37, causing the digital computer 15 to store the contents of the minor scale corrected weight memory 34 in the output memory 32 for display on the digit indicators 52. At this time, the "sample" legend 56 and the "weight" legend 59 become illuminated to identify the displayed data. As long as the sample weight is being displayed on the digit indicators 52, a count of the number of parts on the major scale 11 will not be displayed.

The control panel 45 also mounts the interlocked mode switches 61 and 62. When the ship mode switch 61 is pushed, the digital computer 15 will make repeated calculations of the count of the number of parts on the major scale 11 without requiring entry of either a new tare weight for a container holding the parts on the major scale 11 or of data relating to either the sample parts on the minor scale 12 or an average part weight. Thus in the ship mode an operator may fill a container on the major scale 11 until the container holds a desired number of parts since the count shown on the display 17 is continuously updated. In the receive mode of operation selected by closing the switch 62, the digital computer 15 makes only a single calculation of the number of parts on the major scale 11. Prior to making a new calculation of the count, either the clear key 47 must be pushed or the container holding the parts must be removed from the major scale 11. The digital computer 15 may be adapted to automatically clear memories storing the tare weight of any container holding parts on the scale 11 and sample weight data when the weight stored in the major scale corrected weight memory 33 drops below a predetermined minimum value, such as 0.1 pound.

In addition to manual entry through the digit keys 46 of a tare weight on the major scale 11, the computer 15 may be programmed for entering a tare weight directly from the major scale 11. Normally a tare weight is supplied to the computer only after a container is placed on the scale 11. If the digit keys 46 are pushed at this stage in the parts counting cycle, the entered digits are recognized by the computer 15 as a tare weight. However, if the tare key 48 is pushed without first pushing one or more digit keys 46, the computer 15 recognizes and stores the digitized weight output from the major scale 11 as a tare weight. This automatic tare weight entry from the major scale 11 is particularly convenient when the parts counter 10 is operated in the ship mode wherein an empty container may be first placed upon the major scale 11, entered as a tare weight, and then filled with parts until a desired count is reached.

Figure 3:
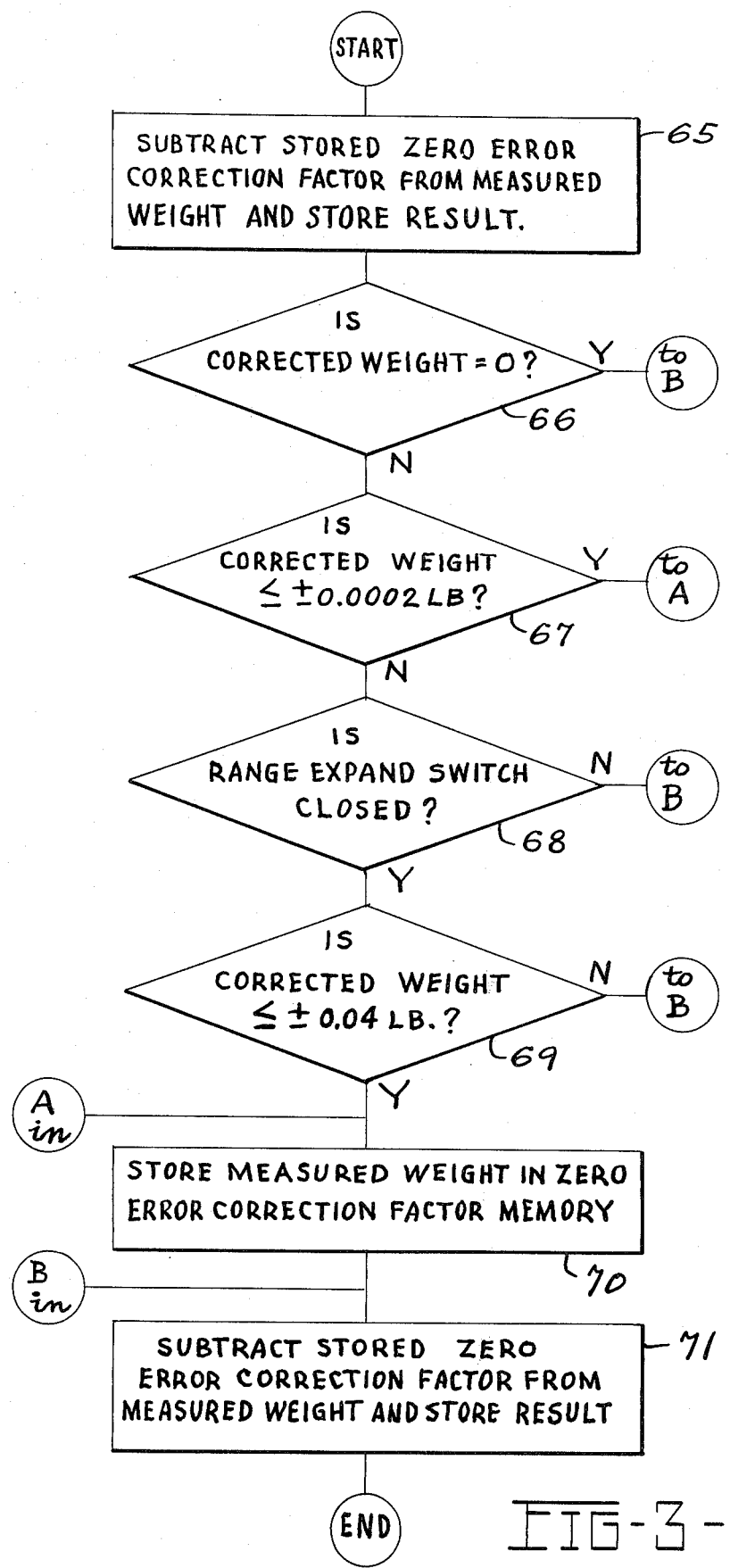
FIG. 3 is a flow diagram showing the manner in which the digital computer corrects the digitized weight output from each of a plurality of scales for zero errors.

Turning now to FIG. 3, a flow chart is shown for the operating sequence followed by the digital computer 15 while correcting the digitized outputs of the scales 11 and 12 for zero errors. The following description will refer specifically to zeroing the digitized output of the minor scale 12. However, it will be appreciated that an identical operating sequence applies to zeroing the output of the major scale 11. Initially, the sequence starts at a block 65 wherein the arithmetic logic unit 30 subtracts a minor scale error correction factor stored in the memory 36 from the digitized output of the minor scale 12. The result is then stored in the minor scale corrected weight memory 34. Then, as shown at a block 66, the arithmetic logic unit 30 compares the result stored in the minor scale corrected weight memory 34 with zero. If the weight is equal to zero, the logic sequence proceeds to a point B which is connected to the input of a block 71. If the corrected weight is not equal to zero, the arithmetic logic unit 30 next compares the corrected weight stored in the memory 34 with a predetermined small amount, such as ±0.0002 pound, as shown by a block 67. If the corrected weight deviates from zero by less than 0.0002 pound, the logic proceeds from the block 67 to a point A which is connected to the input of a block 70 for updating the zero error correction factor. If the corrected weight stored in the memory 34 is greater than 0.0002 pound or some other preselected small amount, the logic proceeds to a block 68 wherein a check is made to see if the switch 39 is closed to expand the range in which the zero error correction factor is updated. If the switch 39 is not closed, the logic proceeds to the point B while if it is closed to expand the correction factor updating range, a check is made as shown by a block 69 to see if the corrected weight stored in the memory 33 deviates from zero by less than an expanded range, such as 2% of the scale capacity or ±0.04 pound. If the corrected weight stored in the memory 34 is greater than the expanded correction range, the logic proceeds to the point B without changing the zero error correction factor while if it falls within the expanded range, the cycle proceeds to the block 70. At the block 70, the sequence controller 31 causes the arithmetic logic unit 30 to store the digitized weight from the minor scale 12 in the minor scale zero error correction factor memory 36. After the zero error correction factor stored in the memory 36 is updated at the block 70, the updated correction factor is subtracted from the digitized weight output from the minor scale 12, as shown by the block 71 and the result is stored in the minor scale corrected weight memory 34. This completes the cycle for correcting the minor scale weight stored in the memory 34 for zero errors. The corrected weight is then used by the arithmetic logic unit 30 for computing a parts count and may also be stored in the output memory 32 for indicating the measured sample part weight on the digital display 17 if the switch 37 is set to the sample weight position.

Other methods may also be used for changing the zero error correction factor. For example, each time the system cycles and the corrected weight deviates from zero by less than the predetermined small amount, the contents of the zero error correction factor memory may be incremented or decremented by a small amount to bring the corrected weight toward zero. The amount by which the correction factor is changed each cycle is preferably smaller than the least significant weight digit used by the computer 15 for computing a part count. For example, the major scale 11 has previously been assumed to have a usable output ranging from 00.01 pound to 80.00 pounds in 0.01 pound increments. In this case, the zero error correction factor may be incremented by smaller units such as 0.001 pound or 0.002 pound. This results in a more accurate zero for the scale and eliminates hunting around zero.

Although the present invention has been described specifically as being embodied in the parts counting apparatus 10, it will be appreciated that the invention in its broadest aspects may be adapted to other systems which include a plurality of scales. The invention in particular may be readily adapted to automated factories and other locations which already have use of a digital computer since the only changes required are the addition of a single analog-to-digital converter, a switch for selectively and sequentially connecting the scales to the converter, computer memory space for storing the correction factors and changes in the operating sequence of the computer. It will also be appreciated that various changes and modifications may be made in the above-described invention without departing from the spirit and the scope of the following claims.

What we claim is:

1. Weight measuring apparatus comprising a plurality of scales each having analog weight outputs, an analog-to-digital converter, switch means for connecting a selected one of the analog weight outputs from said scales to an analog input to said converter whereby such analog weight output is digitized, means for digitally correcting each digitized weight for zero errors in the analog weight outputs, and means for utilizing such corrected digitized weights.

2. Weight measuring apparatus comprising a plurality of scales each having analog weight outputs, means for digitizing such weight outputs, computing means, means for selectively applying the digitized weight outputs to said computing means, said computing means including means for digitally combining a zero error correction factor for each scale with the digitized weight output from such scale to obtain a corrected weight output and means responsive to a corrected weight output from any of said scales deviating from zero by less than a predetermined small amount for establishing a new zero error correction factor for such scale to reduce such zero deviation, and means for utilizing such corrected weight output.

3. Weight measuring apparatus, as set forth in claim 2, wherein said digitizing means comprises a single analog-to-digital converter having an output connected to said computing means, and wherein said means for selectively applying the digitized weight outputs to said computing means selectively connects the analog weight outputs from said scales to an input to said analog-to-digital converter whereby the connected analog weight output is digitized and applied to said computing means.

4. Weight measuring apparatus, as set forth in claim 3, wherein said means for selectively applying the digitized weight outputs from said scales to said computing means includes switch means for selectively and sequentially connecting the analog weight outputs from said scales to the input to said analog-to-digital converter whereby the analog weight outputs from said scales are sequentially digitized and applied to said computing means for zero error correction.

5. A parts counter comprising, in combination, a major scale for weighing an unknown number of parts to be counted, a minor scale for weighing a known number of parts, said scales each including load cell weight measuring means for generating an analog weight signal, an analog-to-digital converter, switch means for selectively applying the analog weight signals from said major scale and from said minor scale to the analog input of said analog-to-digital converter, an arithmetic logic unit connected to the digitized weight output from said converter, a keyboard for supplying manually entered data to said arithmetic logic unit, said arithmetic logic unit including means for computing a count of the number of parts on said major scale from data received from said analog-to-digital converter and said keyboard, and digital display means for indicating such computed parts count, said arithmetic logic unit including means for combining a zero error correction factor for each scale with the digitized weight signal from such scale to obtain a corrected weight for such scale, said arithmetic logic unit using the corrected weight for computing a count of the number of parts on said major scale, and means responsive to the corrected weight signals for either of said major and minor scales deviating from zero by less than a predetermined small amount for generating a new zero error correction factor for such scale.

6. A parts counter, as set forth in claim 5, wherein each of said scales includes analog signal amplifying means, and means for automatically compensating the analog output of said signal amplifying means for any unwanted DC component.

7. A parts counter, as set forth in claim 5, wherein said keyboard includes switch means for causing said arithmetic logic unit to expand for at least one of said scales the predetermined small amount of deviation from zero for which a new zero error correction factor is generated.

8. A parts counter, as set forth in claim 5, wherein said arithmetic logic unit computes a count of the number of parts on said major scale from the corrected weight from said major scale and from average part weight data, said average part weight data comprising either an average part weight supplied from said keyboard or a corrected sample part weight from said minor scale and a count of the number of sample parts on said minor scale supplied from said keyboard.

* * * * *